(12) United States Patent
Zhang et al.

(10) Patent No.: US 11,405,967 B2
(45) Date of Patent: Aug. 2, 2022

(54) ENHANCED FEMTOCELL WITH ON-PREMISE PRIVATE NETWORK SLICE CONTROLLER AND MULTI-ACCESS EDGE COMPUTING SERVICE

(71) Applicant: Verizon Patent and Licensing Inc., Basking Ridge, NJ (US)

(72) Inventors: Zhi-Hong Zhang, Foster City, CA (US); Said Hanbaly, Prosper, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/930,903

(22) Filed: May 13, 2020

(65) Prior Publication Data

US 2021/0360714 A1 Nov. 18, 2021

(51) Int. Cl.
| | | |
|---|---|---|
| *H04W 56/00* | (2009.01) | |
| *H04W 76/12* | (2018.01) | |
| *H04L 61/2514* | (2022.01) | |
| *H04W 84/04* | (2009.01) | |
| *H04L 12/46* | (2006.01) | |
| *H04L 9/40* | (2022.01) | |

(52) U.S. Cl.
CPC ......... *H04W 76/12* (2018.02); *H04L 12/4633* (2013.01); *H04L 61/2514* (2013.01); *H04L 63/0272* (2013.01); *H04W 84/045* (2013.01)

(58) Field of Classification Search
CPC H04W 76/12; H04W 84/045; H04L 12/4633; H04L 61/2514; H04L 63/0272

USPC ........................................................ 370/338
See application file for complete search history.

(56) References Cited

U.S. PATENT DOCUMENTS

| | | | |
|---|---|---|---|
| 10,284,415 B1* | 5/2019 | Alabsi | H04L 41/0896 |
| 2009/0215477 A1* | 8/2009 | Lee | H04W 12/06 |
| | | | 455/466 |
| 2017/0142591 A1* | 5/2017 | Vrzic | H04L 47/2408 |
| 2018/0343567 A1* | 11/2018 | Ashrafi | H04L 67/10 |
| 2019/0104030 A1* | 4/2019 | Giust | H04L 41/0681 |
| 2019/0246334 A1* | 8/2019 | Wang | H04W 48/18 |
| 2019/0259092 A1* | 8/2019 | Oktay | H04W 28/20 |
| 2020/0015115 A1* | 1/2020 | Heo | H04L 67/06 |
| 2020/0389531 A1* | 12/2020 | Lee | H04L 61/1511 |
| 2021/0058297 A1* | 2/2021 | D'Acunto | H04L 41/5019 |
| 2021/0105633 A1* | 4/2021 | Vaidya | H04W 72/0453 |
| 2021/0289436 A1* | 9/2021 | Hu | H04W 24/02 |

* cited by examiner

*Primary Examiner* — Sai Ming Chan (57) ABSTRACT

A device may include a memory storing instructions and processor configured to execute the instructions to receive a request for a connection from a user equipment (UE) device via cellular wireless signals and detect that the request identifies the connection as a private local data connection associated with a private network. The processor may be further configured to select a private application service network slice, from a plurality of network slices, for the connection, in response to detecting that the request identifies the connection as a private local data connection, and route packets associated with the connection to destination devices in the private network using wireless signals while preventing the packets associated with the connection from leaving the private network via a backhaul connection associated with the device.

20 Claims, 9 Drawing Sheets

ENHANCED FEMTOCELL WITH ON-PREMISE PRIVATE NETWORK SLICE CONTROLLER AND MULTI-ACCESS EDGE COMPUTING SERVICE

BACKGROUND INFORMATION

To satisfy the needs and demands of users of mobile communication devices, providers of wireless communication services continue to improve and expand available services as well as networks used to deliver such services. One aspect of such improvements includes the development of wireless access networks as well as options to utilize such wireless access networks. A wireless access network may manage a large number of devices using different types of services and experiencing various types of different conditions, such as different radio frequency (RF) environments. Managing all the various types of RF environments that may arise poses various challenges.

DETAILED DESCRIPTION OF PREFERRED EMBODIMENTS

The following detailed description refers to the accompanying drawings. The same reference numbers in different drawings identify the same or similar elements.

While an enterprise may choose to use WiFi Access Points (AP) to provide wireless communication inside a building, WiFi communication based on the Institute of Electrical and Electronics Engineers (IEEE) 802.11 family of standards may not provide the same level of security as a cellular wireless connections, such as, for example, a Fourth Generation (4G) Long Term Evolution (LTE) connection or a Fifth Generation (5G) New Radio (NR) connection. However, wireless cellular coverage may suffer in indoor environments due to various forms of interference.

For example, a 5G network may utilizing high frequency millimeter (mm) wave bands, and/or lower frequency bands such as Sub 6 Gigahertz (GHz), to provide high bandwidth and high data throughput with low latency applications, such as, for example, as Ultra-Reliable Low Latency Communication (URLLC) and massive Machine Type Communication (mMTC). The mm wave bandwidths utilized by 5G networks may have poor penetration into indoor environments.

In order to extend cellular wireless signal coverage in indoor settings, a provider of wireless communication services may deploy a femtocell. A femtocell may be a small, low-power cellular base station. A femtocell may improve user experience in an indoor environment that would otherwise experience weak cellular coverage. A femtocell may use an existing Internet connection as a backhaul connection to a provider's core network, rather than having a direct connection to the core network like larger base station (which may be referred to as "macrocells"). For example, to reach an application server, a user's data may pass through the femtocell to a router or switch (and firewall) and then through an Internet Service Provider (ISP) gateway device to reach the core network. To enter the core network (e.g., a 4G core network), the data may pass through a Secure Gateway (SeGW), followed by a Serving Gateway (SGW), followed by a Packet Data Network (PDN) Gateway (PGW), then to the Internet or a PDN that includes the application server.

Thus, the data may need to traverse several network devices to reach its destination, which may offset the benefits of low latency provided by 5G. For example, the latency may be higher than 100 milliseconds (ms), which may be too high for Low Latency Communications (LLC), Ultra-Low Latency Communications (ULLC), or URLLC applications. Furthermore, packet delivery rate may not be reliable enough due to packet loss and fragmentation. Additionally, the data may not be secure. For example, an enterprise, such as a business, government agency, or organization may maintain a private network and may desire that data sent and received within the private network does not leave the private network.

Implementations described herein relate to an enhanced femtocell with an on-premise network slice controller and private MEC service. The femtocell may include a network slice controller that manages network slices in a private network and assigns each data connection to a particular network slice, such as, for example, an enhanced Mobile Broadband (eMBB) slice, a URLLC slice, an mMTC slice, and/or another type of network slice associated with a particular type of network traffic. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources, may implement its own set of network functions, may be configured to implement a different set of requirements and/or priorities, and/or may be associated with a particular Quality of Service (QoS) class, type of service, and/or particular enterprise customer associated with a set of UE devices.

For example, the femtocell may receive a request for a connection from a user equipment (UE) device via cellular wireless signals, determine that the request identifies the connection as an eMBB connection, select the eMBB network slice for the connection, and route packets associated with the connection to a core network associated with a provider of cellular wireless communication services via the backhaul link. Moreover, the femtocell may determine when a connection is associated with an application configured for Multi-access Edge Computing (MEC) and may route packets associated with the application to a MEC device in a cloud MEC network associated with the provider via the backhaul link.

Furthermore, the network slice controller in the femtocell may be configured to generate and manage a private application service network slice (e.g., a mission critical computer vision processing, patient data subject to privacy laws, secure financial information, etc.). The private application service network slice may provide a private application service for a private network associated with the femtocell. If a connection is assigned to the private application service network slice, the femtocell may ensure that packets associated with the connection stay in the private network by preventing the packets associated with the connection from being sent via backhaul connection associated with the femtocell.

Thus, the femtocell may be configured to receive a request for a connection from a UE device via cellular wireless signals, detect that the request is a request for a private local data connection associated with a private network, and select, from a set of available network slices, the private application service network slice for the connection, in response to detecting that the request is a request for a private local data connection associated with a private network. The femtocell may then route packets associated with the connection to destination devices in the private network using cellular wireless signals, while preventing the packets associated with the connection from leaving the private network via the backhaul link of the femtocell.

Furthermore, the femtocell may be configured to provide a private MEC service associated with the private application service network slice. A private MEC service may provide MEC services within a private network and by a femtocell, or within geographical and/or network-topological proximity to the femtocell. Thus, a private MEC service may provide MEC at lower latencies that a cloud MEC device reachable via a cellular wireless core network.

The private MEC service may include a central MEC device in the private network and/or distributed MEC units associated with the femtocell. For example, one or more femtocells in the private network may include distributed MEC units that may be implemented, for example, in a pod or container managed by the femtocell. The femtocell may route packets for applications for which MEC has been configured to the central MEC device or to a distributed MEC unit. For example, the femtocell may determine that an application identifier (ID) is configured for MEC, receive an application packet associated with an application ID, and route the application packet to either central MEC device or a distributed MEC unit, based on whether the application has been configured to use the centralized MEC device or the distributed MEC units, and/or based on the availability, capacity, and/or workload associated with the distributed MEC units managed by the femtocell.

The femtocell may include a dashboard functionality that enables an administrator to configure the femtocell for the private network. For example, the dashboard of the femtocell may provide a network slice configuration Application Programming Interface (API), to a UE device associated with an administrator, which enables the administrator to configure particular network slices. For example, the femtocell may receive, via the network slice configuration API, information identifying an application ID that is to be assigned to the private application service network slice and assigning the application ID to the private application service network slice. The femtocell may be configured for multiple different private application service network slices.

Additionally, the network slice configuration API may enable the administrator to configure QoS classes for the private application service network slice. For example, the femtocell may receive, via the network slice configuration API, information identifying QoS classes for the private application service network slice and configure the QoS classes for the private application service network slice.

As another example, the dashboard of the femtocell may provide a MEC configuration API, to a UE device associated with an administrator, which enables the administrator to configure MEC for the private application service network slice. For example, the femtocell may receive, via the MEC configuration API, information identifying an application ID for an application that is to be processed using MEC and route packets associated with the identified application ID to a MEC device associated with the private application service network slice. Additionally, the MEC configuration API may enable an administrator to activate deactivate, and/or modify distributed MEC units. For example, the femtocell may receive, via the MEC configuration API, an instruction to activate a distributed MEC unit, information identifying an application ID to route to the distributed MEC unit, and route packets associated with the identified application ID to the distributed MEC unit.

Figure 1:
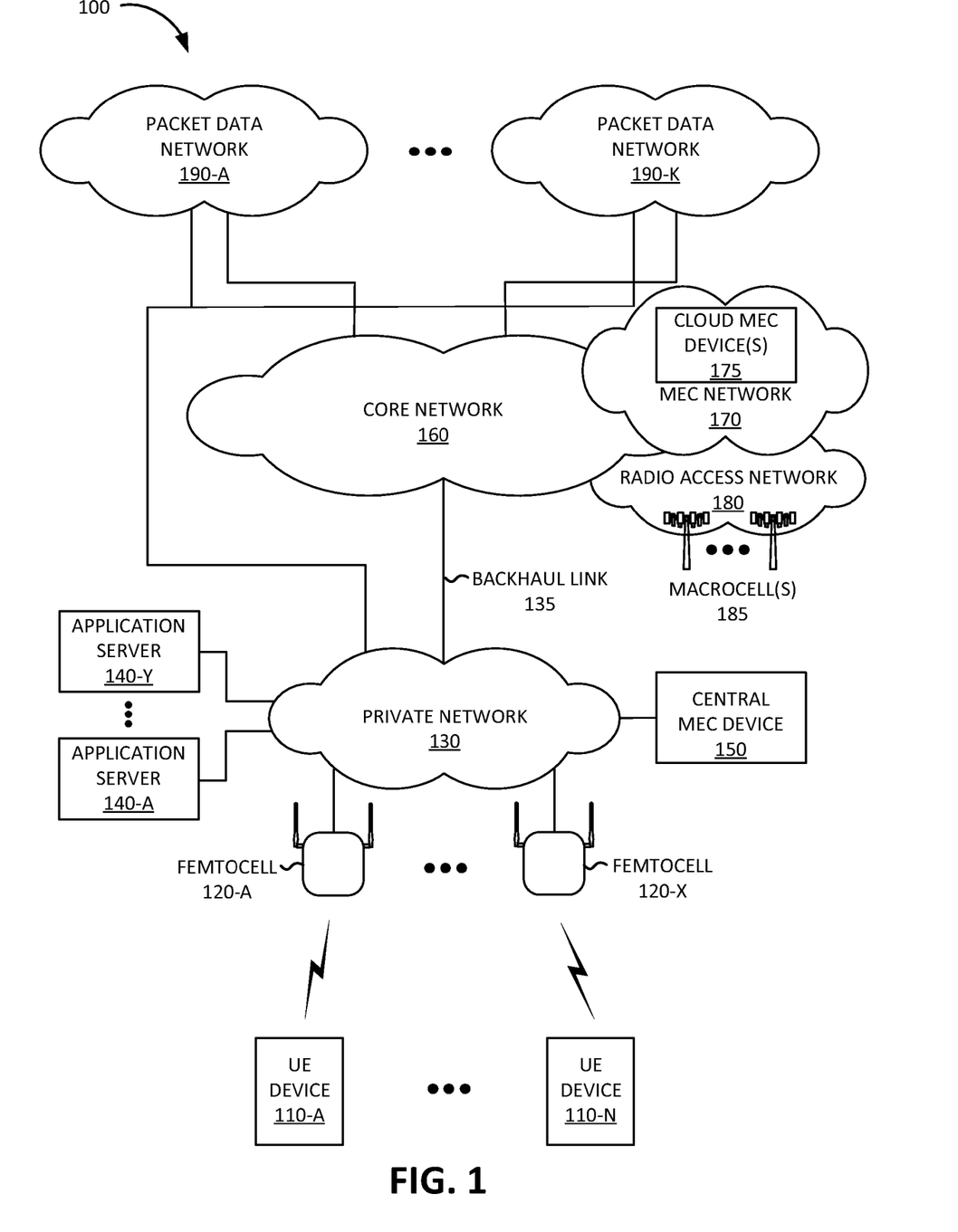
FIG. 1 illustrates an environment according to an implementation described herein.

FIG. 1 is a diagram of an exemplary environment 100 in which the systems and/or methods, described herein, may be implemented. As shown in FIG. 1, environment 100 may include UE devices 110-A to 110-N (referred to herein collectively as "UE devices 110" and individually as "UE device"), femtocells 120-A to 120-X (referred to herein collectively as "femtocells 120" and individually as "femtocell 120"), private network 130, application servers 140-A to 140-Y (referred to herein collectively as "application servers 140" and individually as "application server 140"), central MEC device 150, core network 160, MEC network 170, radio access network (RAN) 180, and packet data networks (PDNs) 190-A to 190-K (referred to herein collectively as "PDNs 190" and individually as "PDN 190").

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as MTC, and/or another type of M2M communication for Internet of Things (IoT) applications. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, an automated teller machine, a vending machine, a parking meter, etc.), and/or another type of electronic device.

Femtocell 120 may provide a cellular wireless connection from UE devices 110 to private network 130. For example, femtocell may include a radio frequency (RF) transceiver configured to communicate with UE devices using a 5G NR air interface using a 5G NR protocol stack, a 4G LTE air interface using a 4G LTE protocol stack, and/or using another type of cellular air interface. Femtocell 120 may authenticate UE device 110 with a subscriber management device (e.g., Home Subscriber Server (HSS) in 4G, Unified Data Management (UDM) in 5G, etc.) and may establish an encrypted wireless communication channel with UE device 110 (e.g., using Internet Protocol Security (IPSec), Transport Layer Security (TLS), etc.) using a symmetric key handshake. Furthermore, femtocell 120 may include a network slice manager that manages network slices, including a private application service network slice associated with private network 130. Furthermore, femtocell may manage MEC within private network 130 by enabling UE devices 110 to connect to MEC network 170, to central MEC device 150, and/or to distributed MEC units within and/or managed by femtocell 120. Femtocell 120 may use the infrastructure of private network 130 to provide a backhaul link 135 to core network 160. Femtocells 120 may facilitate handovers in private network 130. For example, UE device 110 may move from a service area of a first femtocell 120 to the service area of a second femtocell 120 (e.g., in a different area of a building, etc.) and a connection may be handed over from the first femtocell 120 to the second femtocell 120 in response.

Private network 130 may include a Layer 2 and/or Layer 3 network associated with an enterprise, such as business, production plant, medical facility, organization, government agency, and/or another type of enterprise. Private network 130 may enable femtocells 120, application servers 140, and/or central MEC device 150 to communicate with each other, to communicate with core network 160, and/or to communicate with PDNs 190.

Application servers 140 may each provide an application service for UE devices 110 via private network 130. For example, application server 140 may host a web site or an application used or accessed by UE device 110, may collect information from UE devices 110 or send instructions to UE devices 110 (e.g., in MTC applications, etc.), and/or may otherwise communicate and/or interact with UE devices 110.

Central MEC device 150 may provide one or more MEC services to UE devices 110. As an example, a MEC service may include a service associated with a particular application, such as a content delivery system that provides streaming video on demand, an audio streaming service, a real-time online game, a virtual reality application, a medical or health monitoring application, and/or another type of application with a low latency requirement. As another example, a MEC service may include a cloud computing service, such as cache storage, use of artificial intelligence (AI) accelerators for machine learning computations, image processing, data compression, locally centralized gaming, use of Graphics Processing Units (GPUs) and/or other types of hardware accelerators for processing of graphic information and/or other types of parallel processing, and/or other types of cloud computing services. As yet another example, a MEC service may include a network service, such as authentication, for example via a certificate authority for a Public Key Infrastructure (PKI) system, a local Domain Name System (DNS) service, implementation of a virtual network function (VNF), and/or another type of network service. As yet another example, a MEC service may include control of IoT devices, such as hosting an application server for autonomous vehicles, a security system, a manufacturing and/or robotics system, and/or another type of IoT system.

Core network 160 may be managed by a provider of cellular wireless communication services and may manage communication sessions of subscribers connecting to core network 160 via femtocells 120 and/or via RAN 180. For example, core network 160 may establish an Internet Protocol (IP) connection between UE devices 110 and PDN 190.

In some implementations, core network 160 may include an LTE core network (e.g., an evolved packet core (EPC) network). An EPC network may include devices that implement network functions that include a Mobility Management Entity (MME) for control plane processing, authentication, mobility management, tracking and paging, and activating and deactivating bearers; an SGW that provides an access point to and from UE devices, acts as a local anchor point during handovers, and directs gateway to a PGW; a PGW that functions as a gateway to a particular packet data network 160; a Policy and Charging Rules Function (PCRF) that implements policy and charging rules functions, such as establishment of Quality of Service (QoS) requirements, setting allowed bandwidth and/or data throughput limits for particular bearers, and/or other policies; and an HSS that stores subscription information for UE devices, including subscription profiles that include authentication and access authorization information, group device memberships, subscription privileges, and/or other types of subscription information.

In other implementations, core network 160 may include a 5G core network. A 5G core network may include devices that implement network functions that include an Access and Mobility Function (AMF) to perform registration management, connection management, reachability management, mobility management, and/or lawful intercepts; an SMF to perform session management, session modification, session release, IP allocation and management, Dynamic Host Configuration Protocol (DHCP) functions, and selection and control of a UPF; a UPF to serve as a gateway to packet data network 160, act as an anchor point, perform packet inspection, routing, and forwarding, perform QoS handling in the user plane, uplink traffic verification, transport level packet marking, downlink packet buffering, and/or other type of user plane functions; an Application Function (AF) to provide services associated with a particular application; a UDM to manage subscription information, handle user identification and authentication, and perform access authorization; a Policy Control Function (PCF) to support policies to control network behavior, provide policy rules to control plane functions, access subscription information relevant to policy decisions, and perform policy decisions; a Charging Function (CHF) to perform charging and billing functions; a Network Repository Function (NRF) to support service discovery, registration of network function instances, and maintain profiles of available network function instances; a Network Exposure Function (NEF) to expose capabilities and events to other network functions, including third party network functions; a Network Slice Selection Function (NSSF) to select a network slice instance to serve a particular UE device; and/or other types of network functions.

MEC network 170 may provide MEC services for UE devices 110 attached via femtocell 120 and/or via RAN 180. MEC network 170 may interface with RAN 180 and/or with core network 160 via a MEC gateway device (not shown in FIG. 1). MEC network 170 may include a cloud MEC device 175. Cloud MEC device 175 may provide cloud MEC services, such as the MEC services described above with respect to central MEC device 150.

RAN 180 may include one or more macrocells 185. Each macrocell 185 may include devices and/or components configured to enable cellular wireless communication with UE devices 110. Macrocell 185 may include a 5G NR base station (e.g., a gNodeB) and/or a 4G LTE base station (e.g., an eNodeB). Core network 160 may facilitate handovers between femtocell 120 and macrocell 185. For example, if UE device 110 leaves a building serviced by femtocell 120, a connection of UE device 120 may be handed over to macrocell 185. Similarly, if UE device 110 enters the building, a connection may be handed over from macrocell 185 to femtocell 120. In some implementations, femtocell 120 may prevent a connection associated with a private application service network slice from being handed over to macrocell 185 in order to keep the connection within private network 130.

Packet data networks 190-A to 190-N may each include a packet data network. A particular packet data network 160 may be associated with an Access Point Name (APN) and a UE device may request a connection to the particular packet data network 190 using the APN. Packet data network 190 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
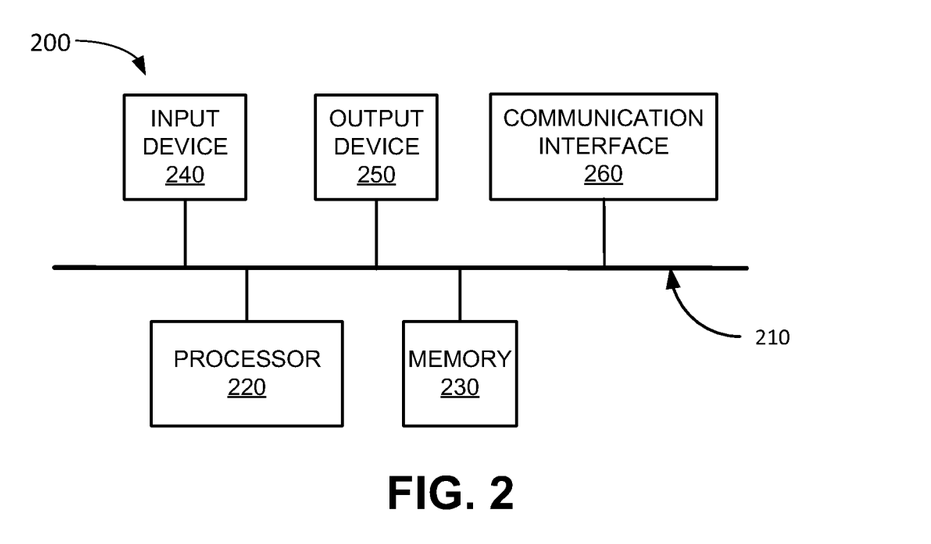
FIG. 2 illustrates exemplary components of a device that may be included in the environment of FIG. 1 according to an implementation described herein.

FIG. 2 is a diagram illustrating example components of a device 200 according to an implementation described herein. The components of environment 100 may each include, or be implemented on, one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some implementations, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the user. In some implementations, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to the operation of a femtocell that includes a network slice controller and provides a private MEC service. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
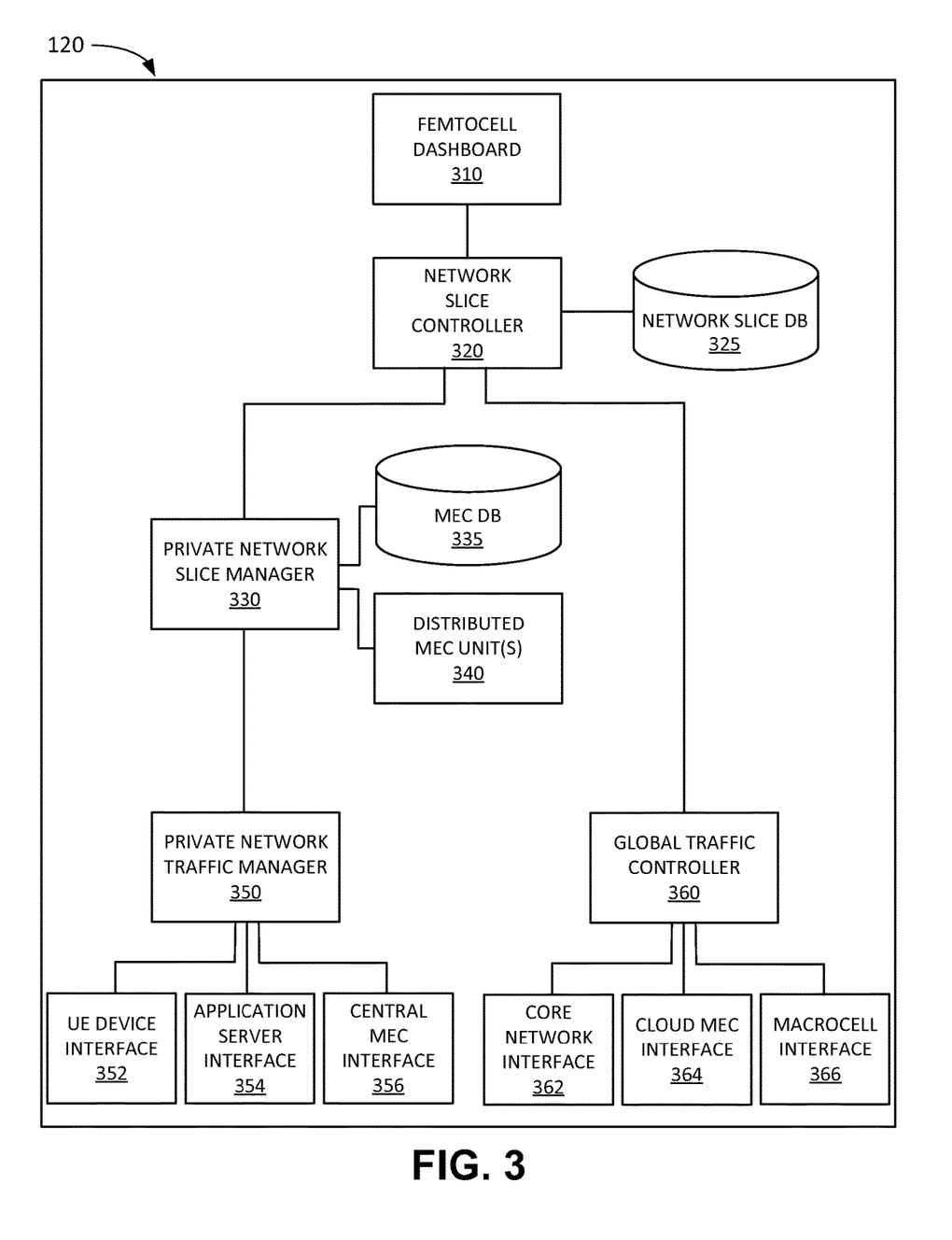
FIG. 3 illustrates exemplary components of the femtocell of FIG. 1 according to an implementation described herein.

FIG. 3 is a diagram illustrating exemplary components of femtocell 120. The components of femtocell 120 may be implemented, for example, via processor 220 executing instructions from memory 230. Alternatively, some or all of the components of femtocell 120 may be implemented via hard-wired circuitry.

As shown in FIG. 3, femtocell 120 may include a femtocell dashboard 310, a network slice controller 320, a network slice database (DB) 325, a private network slice manager 330, a MEC DB 335, one or more distributed MEC units 340 (referred to herein collectively as "distributed MEC units 340" and individually as "distributed MEC unit 340"), a private network traffic manager 350, a UE device interface 352, an application server interface 354, a central MEC interface 356, a global traffic controller 360, a core network interface 362, a cloud MEC interface 364, and a macrocell interface 366.

Femtocell dashboard 310 may enable an administrator to configure femtocell 120. For example, femtocell dashboard 310 may provide a user interface, and/or a set of APIs, to enable the administrator to configure network slices and or MEC services managed by femtocell 120. As an example, femtocell dashboard 310 may provide a network slice configuration API to activate, deactivate, and/or modify particular network slices; to assign application IDs and/or other data traffic labels to a particular network slice; to configure one or more QoS classes in a particular network slice; and/or to configure other types of parameters for a network slice.

As another example, femtocell dashboard 310 may provide a MEC configuration API to activate, deactivate, and/or modify distributed MEC units 340, to assign application IDs and/or other data traffic labels to central MEC device 150 and/or to distributed MEC units 340, assign a workload for an application to a particular distributed MEC unit 340, set a capacity for a particular distributed MEC unit 340, and/or configure other types of parameters for MEC.

As yet another example, femtocell dashboard 310 may provide a mapping and data routing API to configure data routing in private network 130. For example, an administrator may pre-configure and/or mix and match network slices for different locations and/or different devices in private network 130. For example, a user application may use multiple network slices at different locations (e.g., a first network slice at a first location/device, a second network slice at a second location/device, etc.).

Network slice controller 320 may manage network slices in femtocell 120. For example, network slice controller 320 may detect a request for a new connection from UE device 110, may select a network slice for the new connection, and may assign the new connection to the selected network slice. Data traffic associated with the connection may be then processed in accordance with the configuration of the selected network slice. The network slices may include a private application service network slice. Network slice DB 325 may store information relating to network slices managed by femtocell 120. Exemplary information that may be stored in network slice DB 325 is described below with reference to FIG. 4.

Private network slice manager 330 may manage a private application service network slice. For example, private network slice manager 330 may determine whether a connection assigned to the private application service network slice is associated with MEC and may determine whether to route packets destined for MEC to distributed MEC units 340 or to central MEC device 150. Furthermore, private network slice manager 330 may ensure that packets associated with a connection assigned to the private application service network slice stay within private network 130 by preventing the packets from being sent via backhaul link 135 and/or by preventing the connection from being handed over to macrocell 185 if UE device 110 associated with the connection leaves the service area of femtocell 120, or if service capabilities of a macrocell (e.g., signal strength, latency, etc.) exceed that of femtocell 120/private network 130.

MEC DB 335 may store information relating to distributed MEC units 340. Exemplary information that may be stored in MEC DB 335 is described below with reference to FIG. 5. Distributed MEC unit(s) 340 may perform one or more MEC services in femtocell 120, such as, for example, the MEC services described above with respect to central MEC device 150. In some implementations, distributed MEC unit(s) 340 may be implemented in a container or a group of containers referred to as a pod, using a container organization platform. Distributed MEC unit(s) 340 may be generated and activated, or deactivated and the associated resources released, as needed by femtocell 120 and based on the available capacity of femtocell 120. In femtocell embodiments that include multiple distributed MEC units 340, private network slice manager 330 may load balance traffic across distributed MEC units 340 in femtocell 120. Additionally, private network slice managers 330 in different femtocells 120 in private network 130, associated with the same private application service network slice, may communicate with each other to load balance traffic to distributed MEC units 340 in the different femtocells 120.

Private network traffic manager 350 may manage traffic within a particular private application service network slice. For example, private network traffic manager 350 may maintain a forwarding table, and/or a routing table, for UE devices 110, application servers 140, central MEC device 150, and/or other devices (e.g., network devices), in private network 130 and may route traffic assigned to a private application service network slice to destination devices within the private application service network slice. UE device interface 352 may be configured to enable communication with UE devices 110. For example, UE device interface 352 may implement a 4G LTE air interface, a 5G NR air interface, and/or a different type of cellular wireless interface. Application server interface 354 may be configured to enable communication with application servers 140.

Central MEC interface 356 may be configured to enable communication with central MEC device 150.

Global traffic controller 360 may manage global traffic associated with the femtocell, such as traffic not assigned to a private application service network slice. For example, global traffic controller 360 may forward traffic, and/or communicate with, to core network 160, MEC network 170, and/or macrocell 185. Core network interface 362 may enable communication with core network 160 via backhaul link 135. For example, core network interface 362 may implement a set of network interfaces such as, for example, interfaces to communicate with elements in a 4G core network, such as an MME, SGW, PCRF, HSS, etc. and/or interface to communicate with elements in a 5G network, such as an AMF, SMF, PCF, CHF, UDM, AF, NEF, NRF, NSSF, etc. Cloud MEC interface 364 may be configured to communicate with MEC network 170. Macrocell interface 366 may be configured to communicate with macrocells 185 to enable handovers between femtocell 120 and macrocell 185.

Although FIG. 3 shows exemplary components of femtocell 120, in other implementations, femtocell 120 may include fewer components, different components, differently arranged components, or additional components than depicted in FIG. 3. Additionally, or alternatively, one or more components of femtocell 120 may perform functions described as being performed by one or more other components of femtocell 120.

Figure 4:
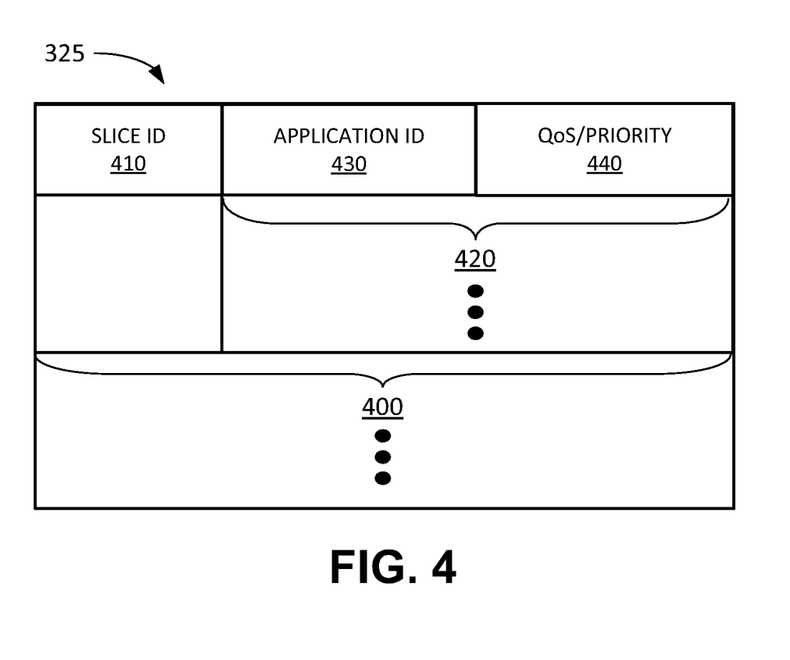
FIG. 4 illustrates exemplary components of the network slice database of FIG. 3 according to an implementation described herein.

FIG. 4 is a diagram illustrating exemplary information stored in network slice DB 325. As shown in FIG. 4, network slice DB 325 may include one or more network slice records 400. Each network slice record 400 may store information relating to a network slice. Network slice record 400 may include a slice ID field 410 and one or more application fields 420.

Each slice ID field 410 may store information identifying a particular network slice. For example, slice ID field 410 may identify a private application service network slice, an eMBB network slice a URLLC network slice, an mMTC network slice, a network slice associated with a particular service or application, a network slice associated with a particular enterprise, a network slice associated with a particular APN, and/or another type of network slice. Network slice DB 325 may store multiple network slice records 400 for multiple private application service network slices managed by femtocell 120.

Each application field 420 may store information for an application associated with the particular network slice. Application field 420 may include an application ID field 430 and a QoS/priority field 440. Application ID field 430 may store an ID associated with the application. QoS/priority field 440 may store a QoS value and/or a priority value that has been assigned to the application within the particular network slice. The QoS/priority values may be used to prioritize packets within the particular network slice.

Although FIG. 4 shows exemplary components of network slice DB 325, in other implementations, network slice DB 325 may include fewer components, different components, additional components, or differently arranged components than depicted in FIG. 4.

Figure 5:
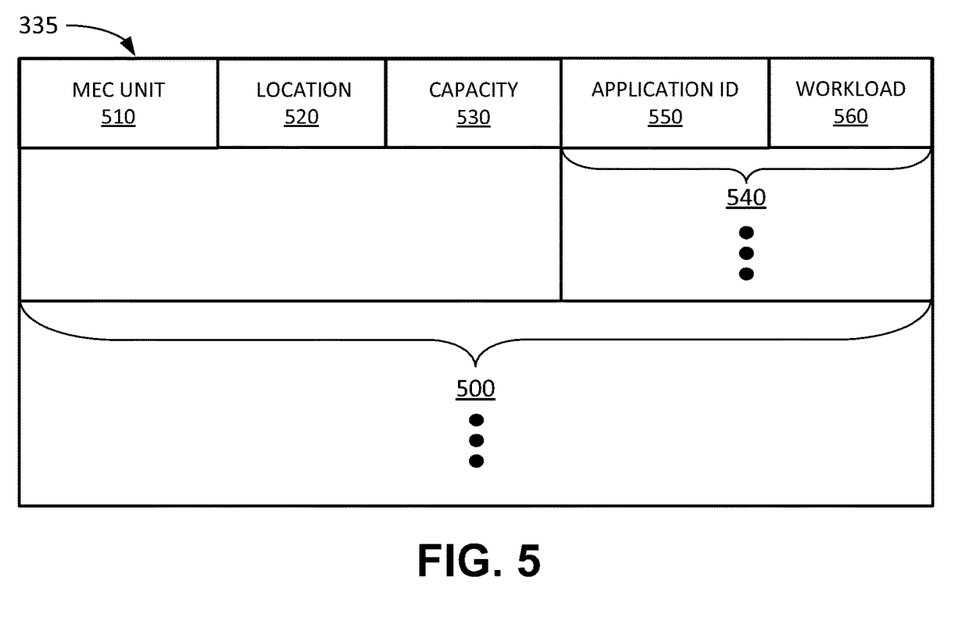
FIG. 5 illustrates exemplary components of the Multi-access Edge Computing (MEC) database of FIG. 3 according to an implementation described herein.

FIG. 5 illustrates exemplary components of MEC DB 355. As shown in FIG. 5, MEC DB 355 may include one or more MEC records 500. Each MEC record 500 may store information relating to a distributed MEC unit 340. MEC record 500 may include a MEC unit field 510, a location field 520, a capacity field 530, and one or more application fields 540.

MEC unit field 510 may store information identifying a distributed MEC unit 340. Location field 520 may store information identifying a location of the distributed MEC unit 340, such as a particular femtocell 120, a particular pod, and/or another type of information specifying where the distributed MEC unit 340 is implemented. Capacity field 530 may store information identifying a total capacity, and/or an available capacity, for the distributed MEC unit 340. The capacity information may include a memory capacity, a storage capacity, a processing capacity, and/or another type of capacity. The capacity information may be used to load balance data sent to different distributed MEC units 340.

Application field 540 may include an application ID field 550 and a workload field 560. Application ID field 550 may store an ID associated with the application. Workload field 560 may include workload information for the application. The workload information may include information identifying which tasks associated with the application should be processed using MEC, what portion of an applications processing tasks should be processed using MEC, service requirements associated with particular tasks of the application, such as, for example, a latency requirement, a throughput requirement, a QoS requirement, a packet delivery rate requirement, and/or another type of requirement, whether MEC tasks for the application should be processed using central MEC device 150 or distributed MEC units 340, and/or other types of information that may be used to select how to process MEC tasks associated with the application.

Although FIG. 5 shows exemplary components of MEC DB 355, in other implementations, MEC DB 355 may include fewer components, different components, additional components, or differently arranged components than depicted in FIG. 5.

Figure 6:
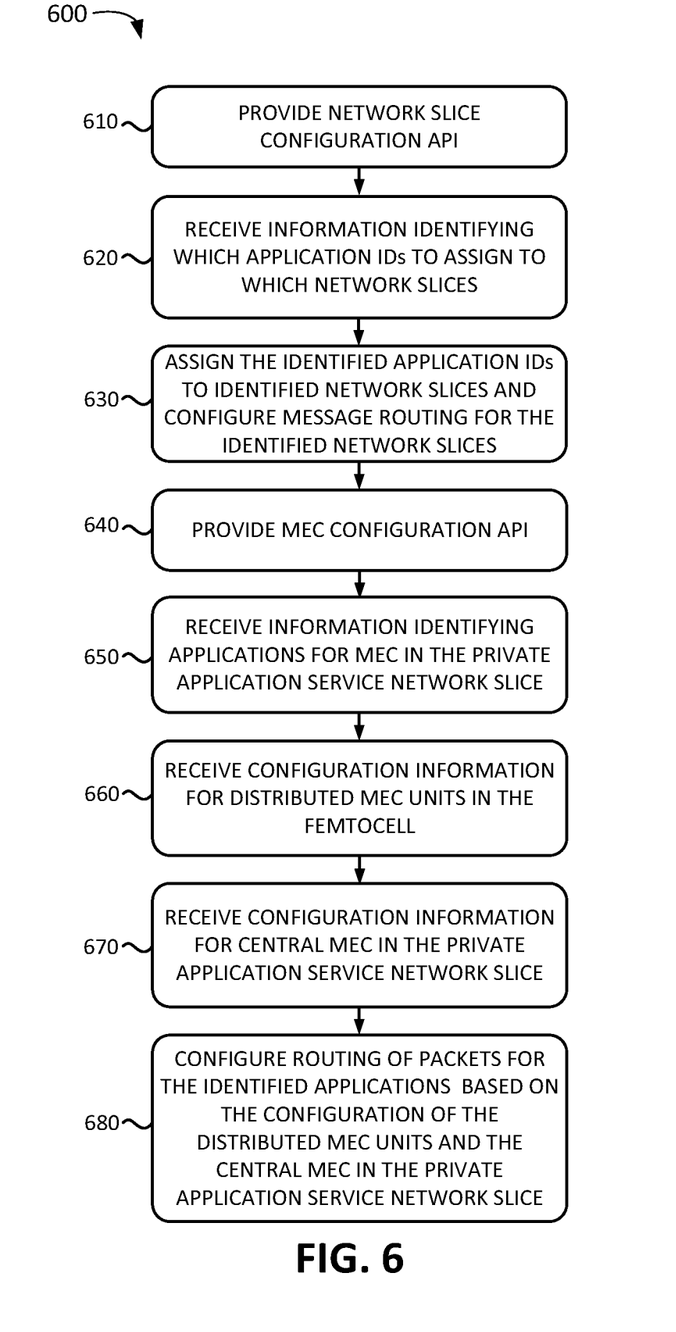
FIG. 6 illustrates a flowchart of a process for configuring a femtocell according to an implementation described herein.

FIG. 6 illustrates a flowchart of a process for configuring femtocell service according to an implementation described herein. In some implementations, process 600 of FIG. 6 may be performed by femtocell 120. In other implementations, some or all of process 600 may be performed by another device or a group of devices separate from femtocell 120.

As shown in FIG. 6, process 600 may include providing a network slice configuration API (block 610) and receiving information identifying which application IDs to assign to which network slices (block 620). For example, an administrator may activate a private application service network slice and select, via the network slice configuration API, one or more applications to associate with the private application service network slice. Process 600 may further include assigning the identified application IDs to the identified network slices and configuring message routing for the identified network slices (block 630). For example, femtocell 120 may update network slice DB 325 to generate a new slice record 400 for the activated private application service network slice and associate the selected one or more applications with the activated private application service network slice.

Process 600 may further include providing a MEC configuration API (block 640) and receive information identifying applications for MEC in the private application service network slice (block 650). Process 600 may further include receiving configuration information for distributed MEC units in the femtocell (block 660) and receiving, via the MEC configuration API, information relating to a central MEC in the private application service network slice (block 670).

For example, the administrator may use the MEC configuration API to activate a distributed MEC unit 340 in femtocell 120 and assign an application to the activated distributed MEC unit 340. As an example, the administrator may select to send packets associated with the application, which include a first label, to the distributed MEC unit 340 and to send packets with associated with the application, which include a second label, to central MEC device 150. As another example, the administrator may select, via the MEC configuration API, a first portion of the workload associated with the application to be processed by distributed MEC unit 340, a second portion of the workload associated with the application to be processed by central MEC device 150, and a third portion of the workload associated with the application to be processed locally in UE device 110.

Process 600 may further include configuring routing of packets for the identified applications based on the configuration of the distributed MEC units and the central MEC in the private application service network slice (block 680). For example, femtocell 120 may update MEC DB 335 to generate a MEC 500 record for the activated distributed MEC unit 340, associate the selected one or more applications with the distributed MEC unit 340, and to store the receive workload information relating to the application in the generated MEC record 500. Furthermore femtocell 120 may update a forwarding and/or routing table to direct packets associated with the application to distributed MEC unit 340 and/or central MEC device 350 based on the selected labels.

Figure 7:
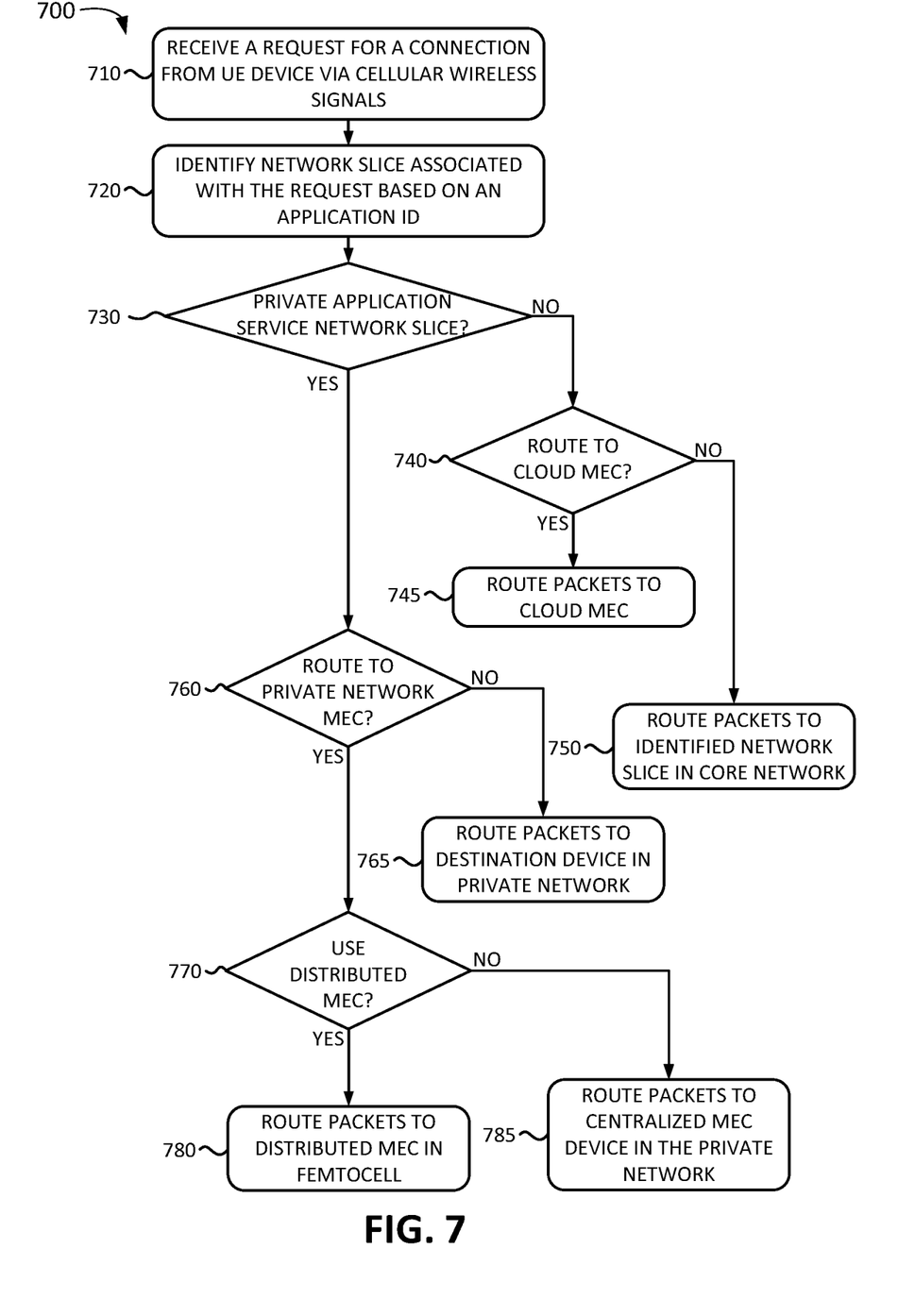
FIG. 7 illustrates a flowchart of a process for managing data traffic in a femtocell according to an implementation described herein.

FIG. 7 illustrates a flowchart of a process for managing data traffic in a femtocell according to an implementation described herein. In some implementations, process 700 of FIG. 7 may be performed by femtocell 120. In other implementations, some or all of process 700 may be performed by another device or a group of devices separate from femtocell 120.

As shown in FIG. 7, process 700 may include receiving a request for a connection from UE device 110 via cellular wireless signals (block 710). For example, UE device 110 may attach to femtocell 120 and send a connection request to femtocell 120 for an application running on UE device 110. A network slice associated with the connection request may be identified based on an application ID (block 720). For example, femtocell 12 may access network slice DB 325 to identify to which network slice the application associated with the connection request is assigned.

A determination may be made as to whether the application is associated with a private application service network slice (block 730). If the application is not associated with a private application service network slice (block 730—NO), a determination may be made as to whether to route the connection to a cloud MEC (block 740). For example, global traffic controller 360 may access a forwarding table and/or routing table to determine whether the application associated with connection is assigned to communicate with cloud MEC device 175.

If it is determined that the connection is to be routed to the cloud MEC (block 740—YES), packets associated with the connection may be routed to cloud MEC device 175 (block 745). If it is determined that the connection is not to be routed to the cloud MEC (block 740—NO), packets associated with the connection may be routed to the identified network slice in the core network (block 750). For example, femtocell 120 may send the packets via backhaul link 135 to a gateway device (e.g., a PGW, a UPF, etc.) associated with the identified network slice. If a network slice cannot be identified for the application, femtocell 120 may select a default network slice, such as, for example, an eMBB network slice.

Returning to block 730, if the application is associated with a private application service network slice (block 730—YES), a determination may be made as to whether to route the connection to a private MEC (block 760). For example, femtocell 12 may access MEC DB 335 to determine whether the application has been assigned for MEC processing. If it is determined that the connection is not to be routed to the private MEC (block 760—NO), the packets associated with the connection may be routed to a destination device in the private network (block 765). For example, femtocell 120 may route the packets to application server 140, another UE device 110, and/or another type of destination device in private network 130. If it is determined that the connection is to be routed to the private MEC (block 760—YES), a determination may be made as to whether to use distributed MEC (block 770). For example, femtocell 120 may access MEC DB 335 to determine whether to use a distributed MEC unit 340 or central MEC device 150. If it is determined that the connection is to be routed to the distributed MEC (block 770—YES), packets may be routed to a distributed MEC unit 340 in femtocell 120, If it is determined that the connection is not to be routed to the distributed MEC (block 770—NO), packets may be routed to central MEC device 150.

Figure 8:
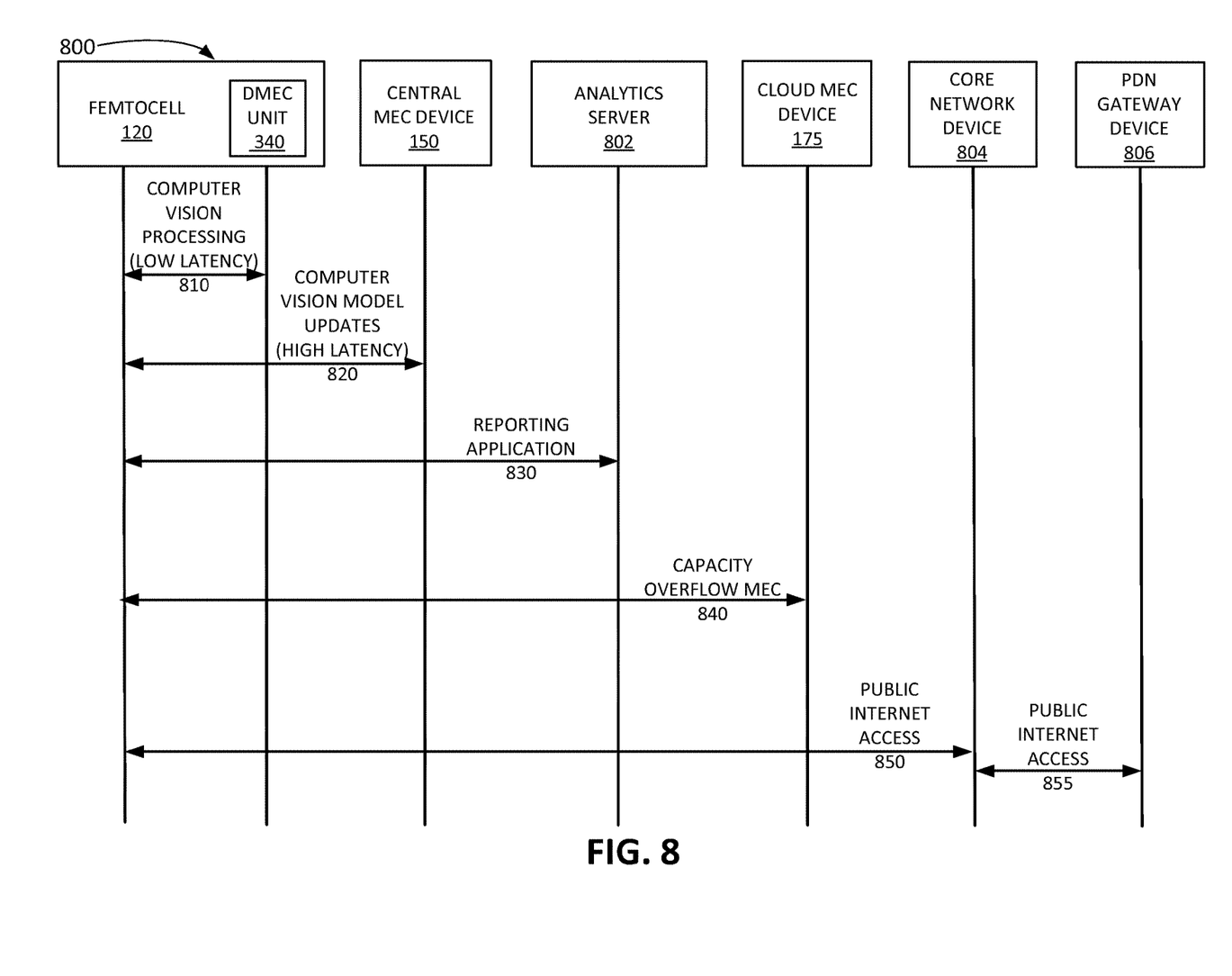
FIG. 8 illustrates a first exemplary signal flow according to an implementation described herein.

FIG. 8 illustrates a first exemplary signal flow 800 according to an implementation described herein. Signal flow 800 may be associated with a private network in a factory. As shown in FIG. 8, signal flow 800 may include femtocell 120 managing a private application service network slice that enables devices in the factory to communicate using cellular wireless signals. Assume the factory includes IoT devices that use MEC to perform calculations. For example, the IoT devices may include robotic arms that use computer vision to manipulate objects on a production line and may use MEC to perform computer vision processing and to update the computer vision model. The computer vision modeling may have a low latency requirement and may performed using distributed MEC (DMEC) units 340 in femtocell 120 (signals 810). Updating the computer vision model may require larger processing capacity and memory and may have not have a low latency requirement. Therefore, data packets used to update the computer vision model may be sent to central MEC device 150 (signals 820). Furthermore, the IoT devices may use a reporting application to send reports to an analytics server 802 in private network 130 (signals 830).

Additionally, the factory may use cloud MEC for other processing tasks that do not require low latency or may use cloud MEC for capacity overflow when distributed MEC units 340 and/or central MEC device 150 run out of processing capacity. Thus, femtocell 120 may send packets for capacity overflow MEC to cloud MEC device 175 (signals 840).

Femtocell 120 may further enable public internet access for employees of the factory. Thus, connection requests from UE devices 110 associated with the employees may be routed to core network 160 via a core network device 804 (e.g., SGW, UPF, etc.) and a PDN gateway deice 806 (signals 850 and 855).

Figure 9:
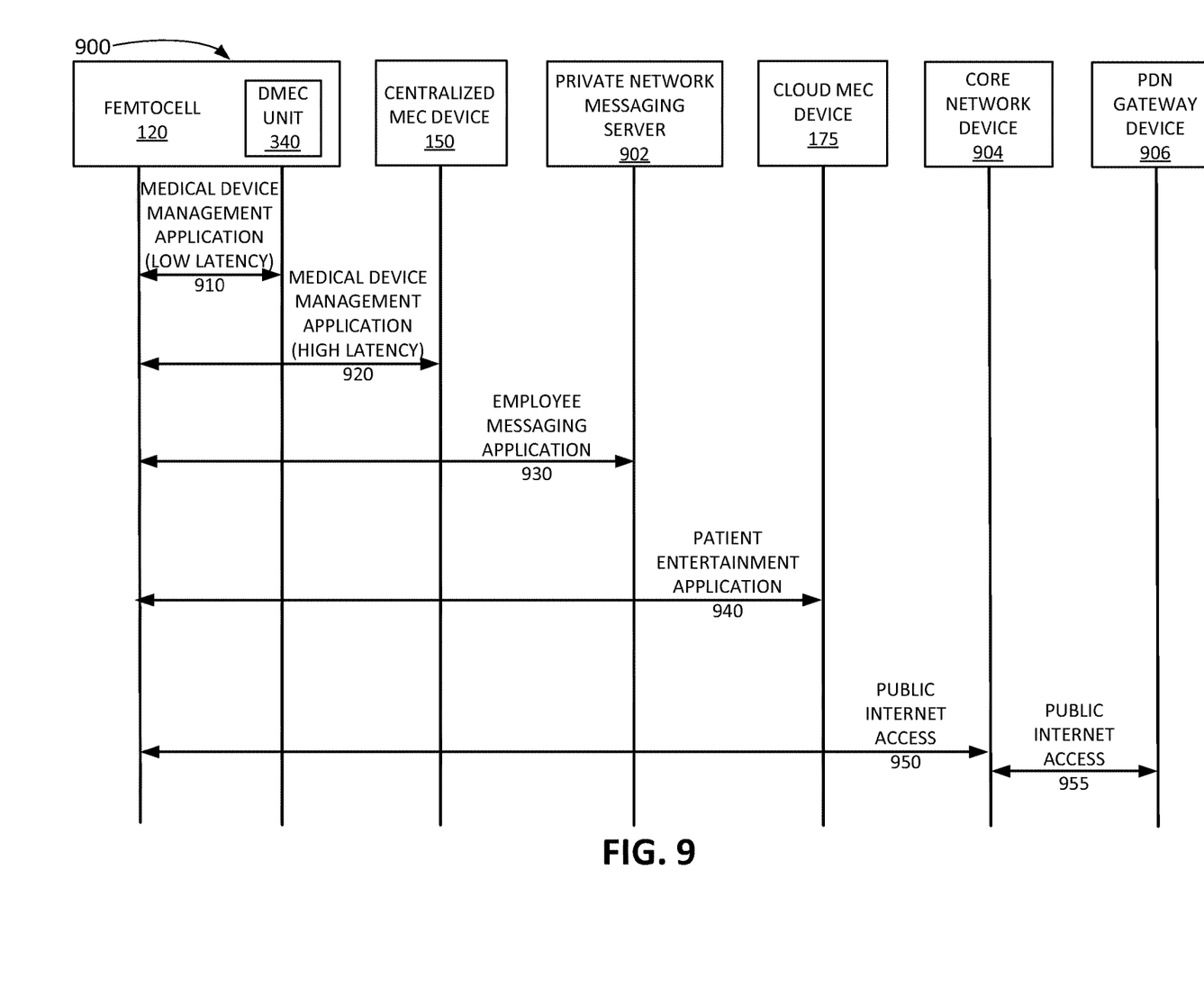
FIG. 9 illustrates a second exemplary signal flow according to an implementation described herein.

FIG. 9 illustrates a second exemplary signal flow 900 according to an implementation described herein. Signal flow 900 may be associated with a private network in a hospital. As shown in FIG. 9, signal flow 900 may include femtocell 120 managing a private application service network slice that enables devices in the hospital to communicate using cellular wireless signals. Assume the factory includes medical devices that use a medical management application that employs MEC to perform calculations and uses a first private application service network slice. For example, the medical devices may include health monitoring devices that use machine learning to predict whether a patient's condition is likely to change in the near future. The prediction calculations may have a low latency requirement and may be performed using distributed MEC (DMEC) units 340 in femtocell 120 (signals 910). Updating the machine learning model may require larger processing capacity and memory and may have not have a low latency requirement. Therefore, data packets used to update and/or retrain the machine learning model may be sent to central MEC device 150 (signals 920). Furthermore, medical staff in the hospital may use an employee messaging application that sends and receives data with high privacy requirements. Therefore, the messaging application may be restricted to a second private application service network slice within the hospital and may be managed by a private network messaging server 902. Therefore, messages sent and received using the private messaging application may be routed by femtocell 120 to private network messaging server 902 (signals 930).

Additionally, the hospital may use cloud MEC for content delivery for a patient entertainment application. Thus, when a patient selects to consume content using the patient entertainment application (e.g., to watch a movie), the request may be routed by femtocell 120 to cloud MEC device 175, as cloud MEC device 175 may host the requested content (signals 940). Femtocell 120 may further enable public internet access for patients and visitors to the hospital. Thus, connection requests from UE devices 110 associated with patients or visitors may be routed to core network 160 via a core network device 904 (e.g., SGW, UPF, etc.) and a PDN gateway deice 906 (signals 950 and 955).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6 and 7, and a series of signals have been described with respect to FIGS. 8 and 9, the order of the blocks, and/or signals, may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    implementing, by a base station, a network slice controller that manages a plurality of network slices in a private network and assigns particular data connections to particular network slices of the plurality of network slices;
    providing, by the base station, a backhaul link to a core network using an infrastructure of the private network;
    receiving, by the base station, a request for a connection from a user equipment (UE) device via wireless signals;
    detecting, by the base station, that the request is a request for a private local data connection associated with a private network;
    selecting, by the base station, a private application service network slice, from the plurality of network slices using the network slice controller, in response to detecting that the request is a request for a private local data connection associated with a private network; and
    routing, by the base station, packets associated with the connection to destination devices in the private network using wireless signals while preventing the packets associated with the connection from leaving the private network via the backhaul connection from the base station to the core network via the infrastructure of the private network.

2. The method of claim 1, wherein the base station includes at least one femtocell.

3. The method of claim 1, further comprising:
providing a network slice configuration Application Programming Interface (API) to an administrator associated with the base station, wherein the network slice configuration API enables the administrator to configure particular ones of the plurality of network slices.

4. The method of claim 3, further comprising:
receiving, via the network slice configuration API, information identifying one or more application identifiers that are to be assigned to the private application service network slice; and
assigning the one or more application identifiers to the private application service network slice.

5. The method of claim 3, further comprising:
receiving, via the network slice configuration API, information identifying a plurality of Quality of Service (QoS) classes for the private application service network slice; and
configuring the plurality of QoS classes for the private application service network slice.

6. The method of claim 1, further comprising:
providing a Multi-access Edge Computing (MEC) configuration Application Programming Interface (API) to an administrator associated with the device, wherein the MEC configuration API enables the administrator to configure MEC for the private application service network slice.

7. The method of claim 6, further comprising:
receiving, via the MEC configuration API, information identifying one or more application identifiers that are to be processed using MEC; and
routing packets associated with the identified one or more application identifiers to a MEC device associated with the private application service network slice.

8. The method of claim 6, further comprising:
receiving, via the MEC configuration API, an instruction to activate, by the base station, a distributed MEC unit associated with the device;
receiving, via the MEC configuration API, information identifying a particular one of the one or more application identifiers to route to the distributed MEC unit; and
routing packets associated with the identified particular one of the one or more application identifiers to the distributed MEC unit associated with the base station.

9. The method of claim 1, further comprising:
receiving an application packet via the connection, wherein the application packet includes an application identifier;
selecting a destination for the application packet based on the application identifier, wherein the destination corresponds to an application server, a Multi-access Edge Computing (MEC) unit associated with the base station, or a centralized MEC device associated with the private network; and
routing the received application packet to the selected destination.

10. The method of claim 1, further comprising:
receiving another request for another connection from another UE device via wireless signals;
determining that the other request identified the other connection as an enhanced Mobile Broadband (eMBB) connection;
selecting an eMBB slice, from the plurality of network slices, for the other connection, in response to determining that the other request identified the other connection as an eMBB connection; and
routing packets associated with the other connection to a core network associated with a provider of wireless communication services via the backhaul connection associated with the base station.

11. The method of claim 10, further comprising:
determining that the other request is associated with an application configured for Multi-access Edge Computing (MEC); and
routing packets associated with the other connection to a MEC device via the backhaul connection associated with the base station.

12. A base station comprising:
a processor configured to:
implement a network slice controller that manages a plurality of network slices in a private network and assigns particular data connections to particular network slices of the plurality of network slices;
provide a backhaul link to a core network using an infrastructure of the private network;
receive a request for a connection from a user equipment (UE) device via wireless signals;
detect that the request is a request for a private local data connection associated with a private network;
select a private application service network slice, from the plurality of network slices using the network slice controller, in response to detecting that the request is a request for a private local data connection associated with a private network; and
route packets associated with the connection to destination devices in the private network using wireless signals while preventing the packets associated with the connection from leaving the private network via the backhaul connection from the base station to the core network via the infrastructure of the private network.

13. The base station of claim 12, wherein the base station includes at least one femtocell.

14. The base station of claim 12, wherein the processor is further configured to:
provide a network slice configuration Application Programming Interface (API) to an administrator associated with the base station, wherein the network slice configuration API enables the administrator to configure particular ones of the plurality of network slices;
receive, via the network slice configuration API, information identifying one or more application identifiers that are to be assigned to the private application service network slice; and
assign the one or more application identifiers to the private application service network slice.

15. The base station of claim 14, wherein the processor is further configured to:
receive, via the network slice configuration API, information identifying a plurality of Quality of Service (QoS) classes for the private application service network slice; and
configure the plurality of QoS classes for the private application service network slice.

16. The device of claim 12, wherein the processor is further configured to:
provide a Multi-access Edge Computing (MEC) configuration Application Programming Interface (API) to an administrator associated with the base station, wherein the MEC configuration API enables the administrator to configure MEC for the private application service network slice;
receive, via the MEC configuration API, information identifying one or more application identifiers that are to be processed using MEC; and
route packets associated with the identified one or more application identifiers to a MEC device associated with the private application service network slice.

17. The device of claim 16, wherein the processor is further configured to:
receive, via the MEC configuration API, an instruction to activate, by the base station, a distributed MEC unit associated with the base station;
receive, via the MEC configuration API, information identifying a particular one of the one or more application identifiers to route to the distributed MEC unit; and
route packets associated with the identified particular one of the one or more application identifiers to the distributed MEC unit associated with the base station.

18. The base station of claim 12, wherein the processor is further configured to:
receive another request for another connection from another UE device via wireless signals;
determine that the other request identified the other connection as an enhanced Mobile Broadband (eMBB) connection;
select an eMBB slice, from the plurality of network slices, for the other connection, in response to determining that the other request identified the other connection as an eMBB connection; and
routing packets associated with the other connection to a core network associated with a provider of wireless communication services via the backhaul connection associated with the base station.

19. The base station of claim 18, wherein the processor is further configured to:
determine that the other request is associated with an application configured for Multi-access Edge Computing (MEC); and
route packets associated with the other connection to a MEC device via the backhaul connection associated with the base station.

20. A femtocell comprising:
a wireless transceiver configured to send and receive wireless signals;
a traffic controller configured to provide a backhaul link to a core network using an infrastructure of the private network; and
a network slice controller configured to:
manage a plurality of network slices in a private network and assign particular data connections to particular network slices of the plurality of network slices;
receive a request for a connection from a user equipment (UE) device via wireless signals using the wireless transceiver;
detect that the request is a request for a private local data connection associated with a private network;
select a private application service network slice, from the plurality of network slices, for the connection, in response to detecting that the request is a request for a private local data connection associated with a private network; and
route packets associated with the connection to destination devices in the private network using the wireless transceiver while preventing the packets associated with the connection from leaving the private network via the backhaul connection from the base station to the core network via the infrastructure of the private network.

\* \* \* \* \*